(12) United States Patent
Boutaghou

(10) Patent No.: US 6,215,621 B1
(45) Date of Patent: *Apr. 10, 2001

(54) MULTI-TIER BEARING WITH DEPOSITED TIER

(75) Inventor: Zine-Eddine Boutaghou, Vadnais Heights, MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,668

(22) Filed: Jul. 16, 1998

Related U.S. Application Data

(60) Provisional application No. 60/064,931, filed on Nov. 7, 1997.

(51) Int. Cl.[7] .................................................. G11B 5/39
(52) U.S. Cl. ............................................................ 360/236.6
(58) Field of Search ......................... 360/103, 235.4–237

(56) References Cited

U.S. PATENT DOCUMENTS

| | | | |
|---|---|---|---|
| 4,212,044 | 7/1980 | Plotto | 360/103 |
| 5,062,017 | 10/1991 | Strom et al. | 360/103 |
| 5,200,868 | 4/1993 | Chapin et al. | 360/103 |
| 5,726,831 | * 3/1998 | White | 360/103 |
| 5,862,013 | * 1/1999 | Haga | 360/103 |

FOREIGN PATENT DOCUMENTS 61-204877   10/1986   (JP) .

OTHER PUBLICATIONS

Exhibit "A", prior art (1 page).
"Stiffness and Damping Evaluation of Air Bearing Sliders and New Designs with High Damping" by Q.H. Zeng and D.B.Bogy for Computer Mechanics Laboratory, Department of Mechanical Engineering, University of California, Berkeley, (prior art).

* cited by examiner

Primary Examiner—A. J. Heinz
(74) Attorney, Agent, or Firm—Westman, Champlin & Kelly, P.A.

(57) ABSTRACT

An improved bearing design for a slider supporting transducer elements for operation of a data storage system, the bearing comprising a multi-tier structure including a primary bearing surface and secondary bearing surface spaced below the primary bearing surface. The primary bearing surface is being formed by a deposit layer on the secondary bearing surface. The primary bearing surface is being arranged on the secondary bearing surface for desired operation of the slider.

19 Claims, 8 Drawing Sheets

MULTI-TIER BEARING WITH DEPOSITED TIER

CROSS-REFERENCE TO RELATED APPLICATION

This application claims priority to U.S. Provisional application Ser. No. 60/064,931, entitled "LOAD/UNLOAD AIR BEARING WITH IMPROVED DAMPING CHARACTERISTICS", filed Nov. 7, 1997.

BACKGROUND OF THE INVENTION

The present invention relates to a data storage system. In particular, the present invention relates to an improved bearing design of a slider for supporting transducer elements for read and write operations for a data storage device.

Disc drives are well known which store digital information on discs. Transducer elements operate relative to the disc surface to read information from and write information to the disc surface. The transducer elements are typically supported via a slider which includes a bearing surface which is aligned relative to the disc surface. The slider is resiliently supported via a suspension assembly coupled to an actuator block for positioning the slider (and transducer elements supported thereby) relative to selected data tracks on the disc surface. The slider and transducer elements are aligned relative to discs which are supported via a spindle motor for rotational operation.

Rotation of the disc causes air to flow underneath the slider and interact with an air bearing surface to lift the slider to fly above the disc surface for load and unload operations. A preload force is supplied to the slider via the suspension assembly to counteract the hydrodynamic lifting force to provide an equilibrium lifting force based on the hydrodynamic properties of the slider and the speed of rotation of the disc to define the fly height of the slider.

During load and unload operations, the position of the slider is unstable until the hydrodynamic lifting force and load force of the load beam settle to an equilibrium position to define the fly height for the slider. During dynamic operation of the slider, various forces caused by vibration, shock, or turbulent air flow to the bearing may interfere with equilibrium conditions. It is desirable to provide enhanced system response to settle the slider to an equilibrium position for read and write operations. One method for enhancing system response is to provide an air bearing design with enhanced dampening and stiffness characteristics. Such designs might increase the manufacturing complexity of the slider, affecting tolerance control for the fly height dynamics of the slider.

SUMMARY OF THE INVENTION

The present invention relates to an improved bearing design for a slider supporting transducer elements for operation of a data storage system. The bearing includes a multi-tier bearing surface structure. The multi-tier bearing surface structure includes primary and secondary bearing surfaces. The secondary bearing surface is formed at the slider substrate and the primary bearing surface is formed of a deposit layer to provide a slider with enhanced dampening and stiffness characteristics which can be fabricated for desired fly height characteristics and parameters.

Figure 1:
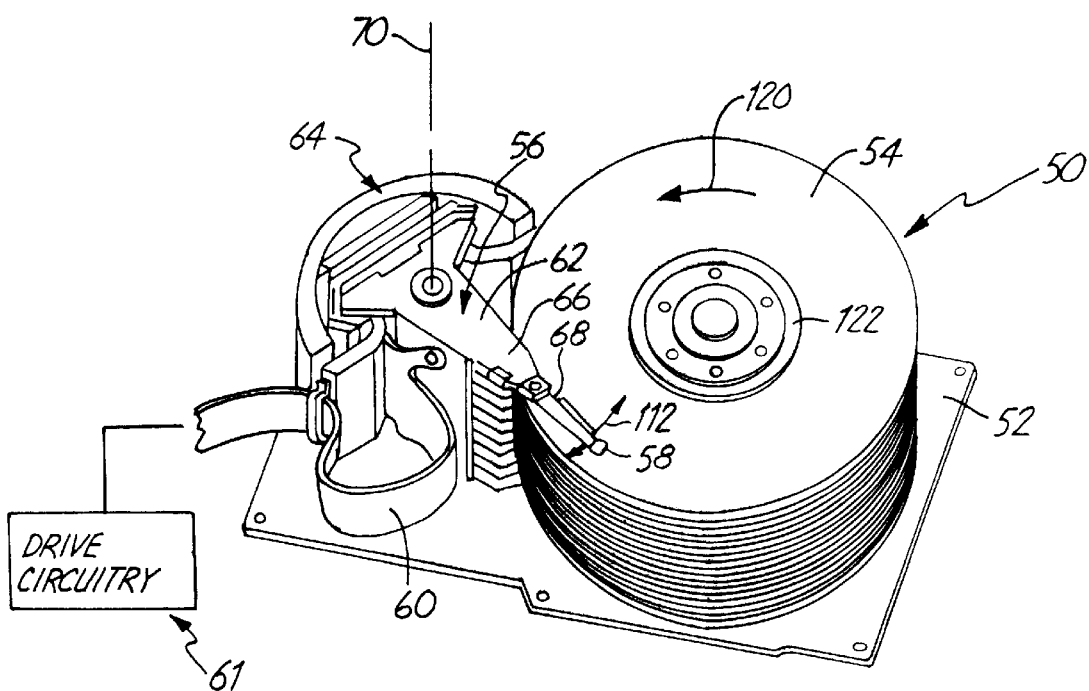
FIG. 1 is a perspective illustration of a disc drive.

It should be noted that the drawings are not to scale and details in the drawings have been exaggerated for clarity.

DETAILED DESCRIPTION OF THE PREFERRED EMBODIMENTS

The present invention relates to a data storage system and, in particular, has applications to a disc drive 50 for storing digital information as shown in FIG. 1. As shown, disc drive 50 includes a base 52; a disc stack 54; and rotary actuator 56, which supports heads 58 relative to surfaces of disc stack 54 to read and write information to and from the disc stack. Heads 58 are coupled to a flex circuit 60, which is coupled to circuitry 61 of the disc drive for read and write operations. In particular, the rotary actuator 56 includes an actuator block 62 and a voice coil motor 64 for movement.

Figure 2:
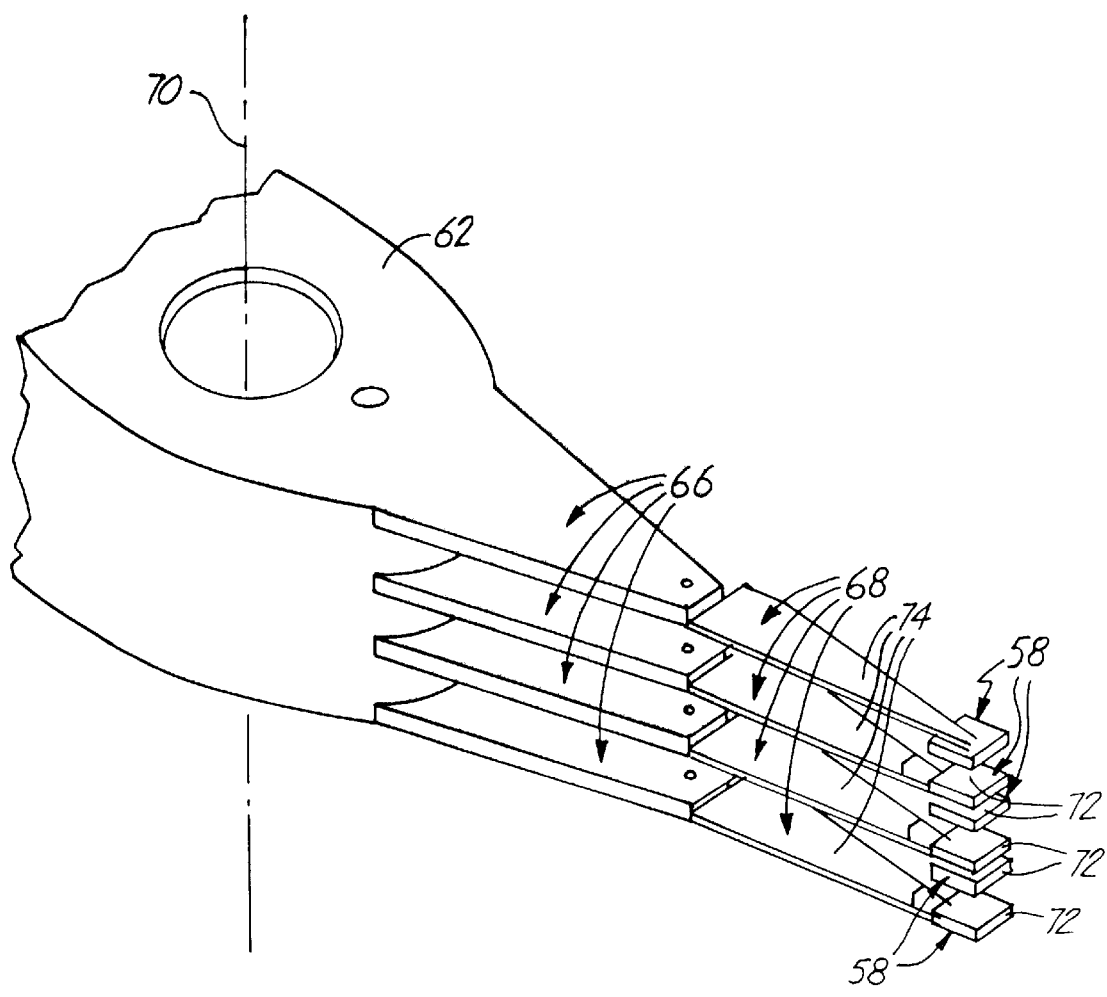
FIG. 2 is a perspective view of an actuator block supporting heads for read and write operations.

Heads 58 are supported relative to the actuator block 62 via a plurality of stacked actuator arms 66. The heads 58 are coupled to the actuator arms 66 via suspension assemblies 68 in a known manner. Operation of the disc drive rotates the actuator block about an axis 70 for positioning heads 58 relative to selected data tracks on the disc drive via operation of the voice coil motor 64 for read and write operations. FIG. 2 is a perspective detailed view of the actuator block 62, which illustrates heads 58 supported via suspension assemblies 68 coupled to actuator arms 66. As shown, heads 58 include a slider 72, which supports the transducer elements for read and write operations. The suspension assemblies 68 include load beams 74 which provide a load force to the slider 72 at a load point about which the slider pitches and rolls.

Figure 3:
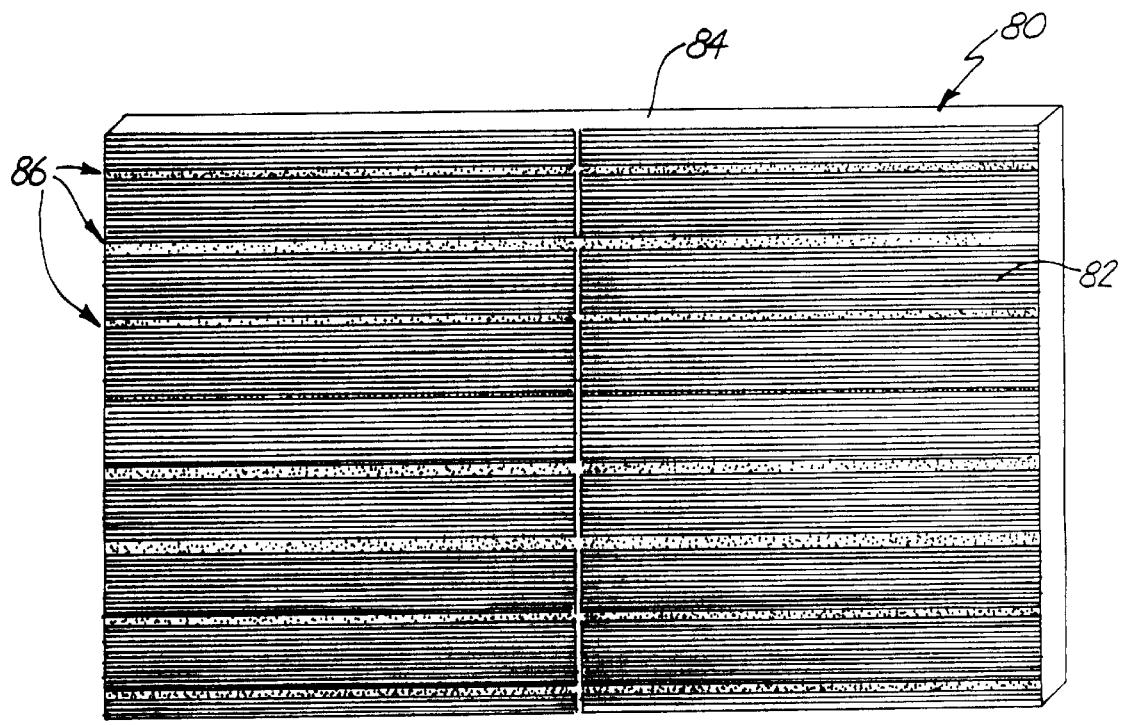
FIG. 3 is a perspective illustration of a wafer forming sliders supporting transducer elements for operation of a disc drive.
Figure 4:
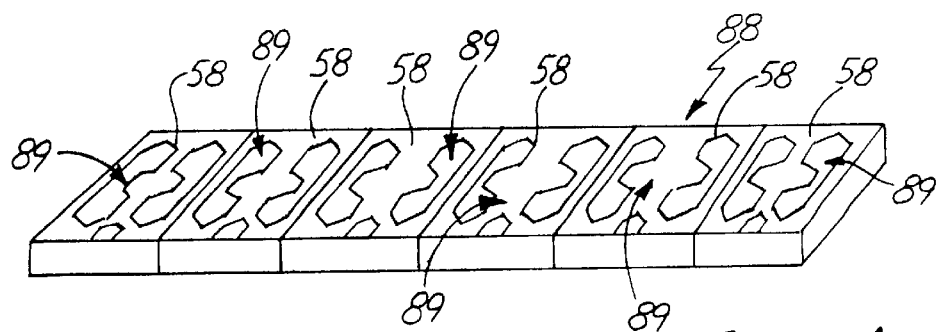
FIG. 4 is a perspective illustration of a bar sliced from a wafer including a plurality of sliders.
Figure 5:
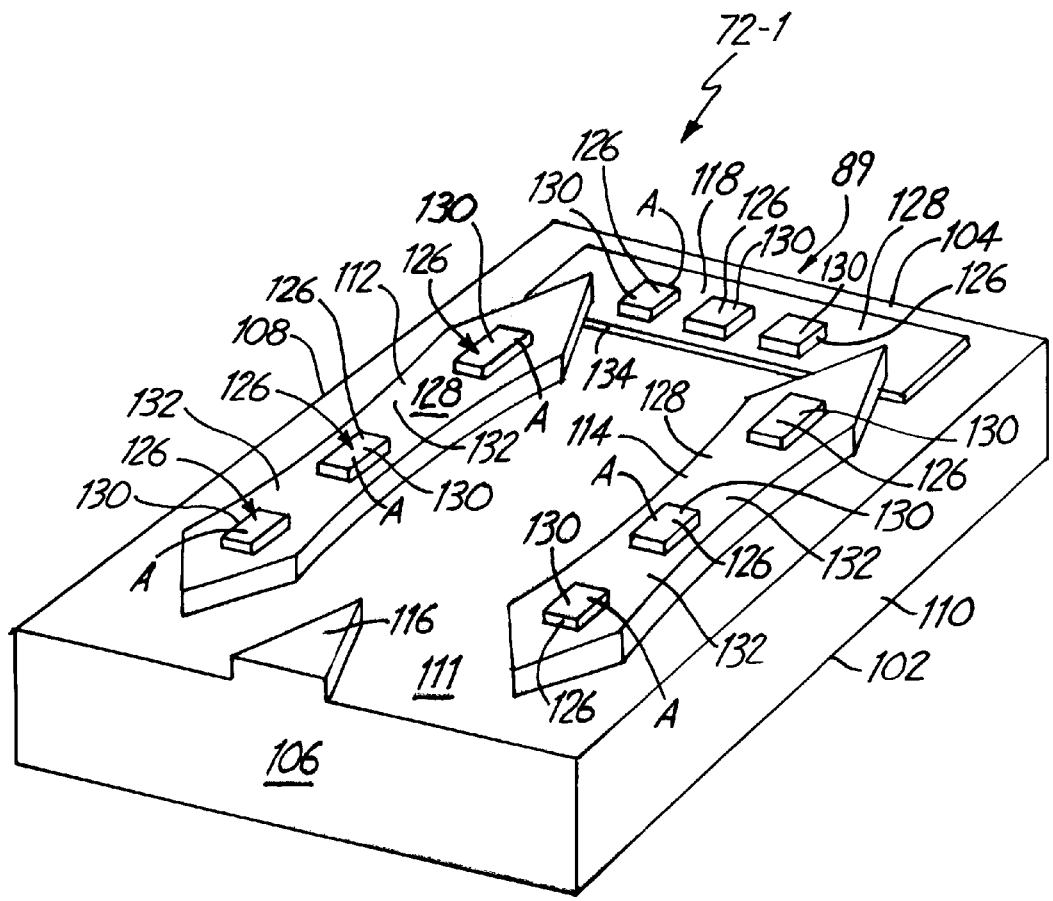
FIG. 5 is a perspective view of an embodiment of a slider including a multi-tier bearing surface of the present invention.
Figure 6:
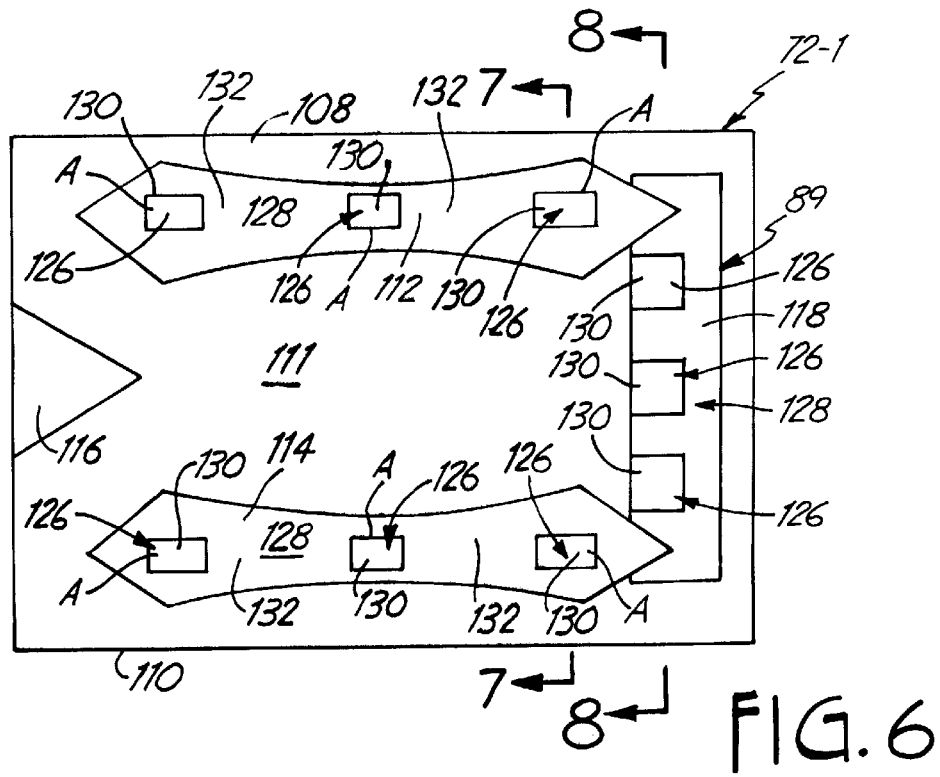
FIG. 6 is a plan view of the slider of FIG. 5.

Sliders 72 are fabricated from a wafer 80, as illustrated in FIG. 3. During the fabrication process a matrix of transducers (not shown) are applied to surface 82 of the wafer substrate 84 to form a matrix of heads which are separated for manufacture and assembly into a disc drive. Transducers may be inductive-type transducers or magnetoresistive transducers. Rows 86 of heads are sliced to form bars 88 as illustrated in FIG. 4. Individual heads 58 are sliced from bars 88. During fabrication, bars 88 are lapped in a known manner and air bearings 89 are formed on a surface of the bar to form air bearing sliders having transducer elements formed on an edge of the slider. Operating elements (i.e., poles for inductive-type transducer elements) of the transducer elements and bearing 89 are parallelly arranged to face the disc 54 during operation.

FIGS. 5–8 illustrate one embodiment of a slider 72-1 of the present invention. As shown, slider 72-1 includes an upper surface 102, a bearing 89, a leading edge 104, a trailing edge 106, and opposed sides 108 and 110. The upper surface 102 is coupled to the suspension assembly 68 to support the bearing 89 to face the disc surface. The bearing 89 includes bearing surfaces which are raised above a base surface or cavity 111 of the slider. In the embodiment shown, the raised bearing surfaces include side rails 112, 114, and center rail 116. The bearing surfaces provide lift to the slider for operation of the transducer elements supported at the trailing edge 106 of the slider 72-1. The bearing 89 also includes a stepped leading edge 118 which defines a bearing surface for operation of the slider.

Figure 9:
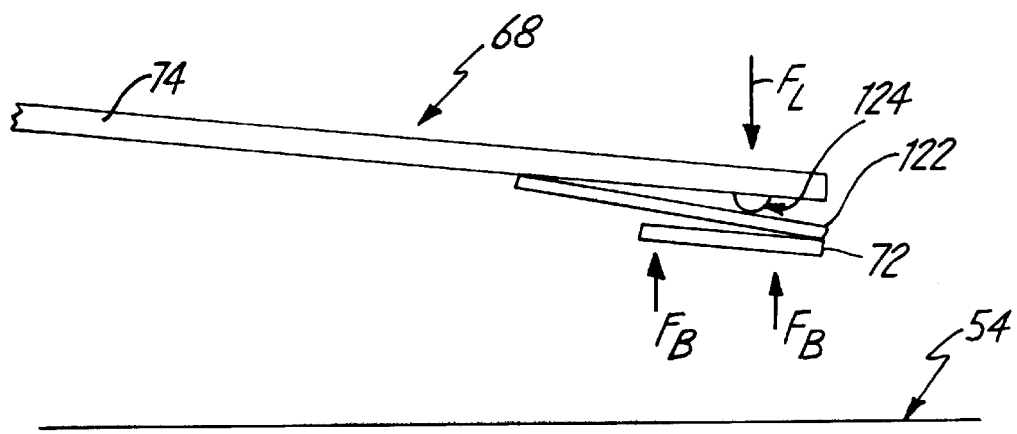
FIG. 9 is a side illustration view of a suspension assembly supporting a slider.

During operation of the disc drive, rotation of the disc as illustrated by arrow 120 of FIG. 1 provides air flow under the bearing 89. The air flow is directed from the leading edge 104 to the trailing edge 106. Skin friction under the bearing surfaces causes the air pressure between the disc and the air bearing surfaces to increase which provides a lifting force causing the slider to lift above the disc surface. As previously explained the slider 72 is supported via suspension assembly 68. As illustrated in FIG. 9, suspension assembly 68 typically includes load beam 74 and a gimbal spring 122 (not shown in FIG. 9). Gimbal spring 122 supports the slider to pitch and roll about a pivot point 124. Load beam 74 supplies a load force $F_L$ (at a load point coinciding with pivot point 124) to the slider 72 to counteract the lift force of the bearing surfaces illustrated by arrows $F_B$. The balance of the lift force $F_B$ created by the bearing surfaces and the load force $F_L$ supplied by load beam 74 at least partially defines the fly height of the slider for read and write operations.

For operation of the disc drive, forces are applied to the slider 72 to operate the slider 72 above the disc surface 54 for proximity recording. This process may be referred to as loading and unloading the slider for operation. In particular, during start up of the disc drive, the disc rotates to provide air flow for operation of the air bearing 89. Once air flow commences, a significant lifting force $F_B$ is imparted to the slider and thus is imparted to the load beam. The load beam 74 provides a reactive force $F_L$ to the slider to counterbalance the lifting force $F_B$. The dynamic response of the load beam 74 to counteract the lifting force $F_B$ of the bearing causes the slider 89 to vibrate so that the slider 72 is unstable until the system settles to an equilibrium position defining the fly height of the slider 72. It is desirable that the system settle rapidly to a desired fly height when the slider is loaded or unload for desired operating characteristics of the disc drive.

To enhance operation of the disc drive for load and unload operations, multi-tier bearing surface structures have been proposed to improve dampening characteristics for enhancement of system response for read and write operations. The multi-tier bearing surfaces include offset-spaced bearing surfaces. To improve system response and settling characteristics, it is important to control the spacing of the bearing surfaces for desired operating characteristics. Typically, bearing surfaces are formed above a base cavity 111 by known subtractive masking processes such as milling or chemical etching. In prior slider embodiments, multi-tier bearing surfaces were formed by subtractive masking techniques. However, without precision control of the subtractive process, desired control of the air bearing surface dimensions is not achieved.

In the embodiment of the slider of the present invention illustrated in FIGS. 5–8, a multi-tier bearing surface structure includes primary bearing surfaces 126 and secondary bearing surfaces 128. The primary bearing surfaces 126 are formed of a deposited layer on the secondary bearing surface 128. In particular, as shown in FIGS. 5–8, bearing surfaces 112, 114, and 116 are formed of the slider substrate surface. Bearing cavities 111 and stepped surface 118 are formed by known subtractive processes. Rails 112, 114, and 116 and stepped surface 118 define secondary bearing surfaces 128. Typically, the rails 112, 114, and 116 extend 8.0 microns above the base or bearing cavity 111, as illustrated by reference 129 in FIG. 7.

Figure 7:
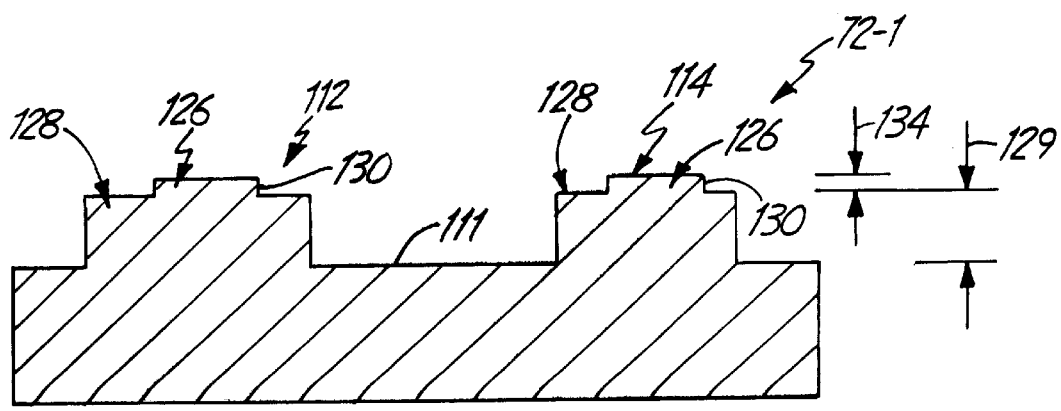
FIG. 7 is a cross-sectional view as taken along line 7—7 of FIG. 6.
Figure 8:
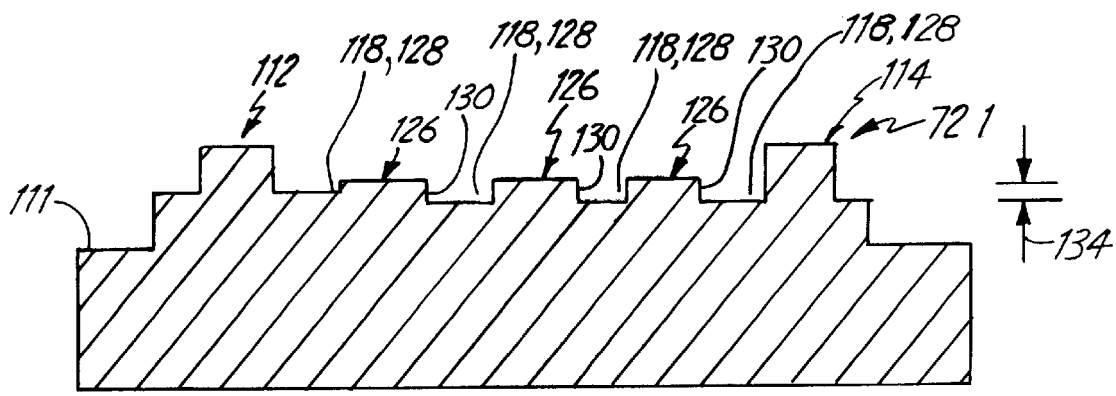
FIG. 8 is a cross-sectional view as taken along line 8—8 of FIG. 6.

The primary bearing surface is formed of a layer 130 deposited on the secondary bearing surfaces in a desired pattern by known deposit techniques. Multiple layers 130 are dispersed over the entire substrate surface (i.e., secondary bearing surfaces) to form a bearing surface structure having dispersed bearing pockets 132 defined by the multi-tier bearing structure (primary and secondary bearing surfaces) and separated by the primary bearing surfaces for enhancing dampening and stiffness characteristics. The primary bearing surfaces 126 are elevated from the secondary surfaces 128 a distance 134 for improved dampening and settling characteristics as illustrated in FIGS. 7–8. Preferably, the distance 134 is in the range of 1.0–3.0 μinches. The primary bearing surfaces of the present invention formed of a deposited layer construction provide improved tolerance dimension control for desired lift and operating characteristics. Preferably, the primary bearing surface is formed of a relatively hard material such as a diamond-like carbon. Thus, the bearing surface provides enhanced wear resistance for contact starts and stops ("CSS") and provides wear resistance over previous bearing surfaces for head slap or other slider contact with the disc surface.

Thus, as described, the multi-tier bearing surface structure enhances system dampening and stiffness characteristics for improved response to dynamic conditions. In particular, the multi-tier bearing provides settling characteristics for load and unload operations as well as provides improved dampening behavior during operations to compensate for turbulent or perturb air flow under the bearing surface or other shock or non-steady state conditions.

In the embodiment described with reference to FIGS. 5–8, the transducer elements are deposited on trailing edge 106 of the slider 72 during the wafer fabrication process. Since primary bearing surfaces 126 (deposit layers 130) are elevated from the substrate surface, the transducer elements (and operating elements) are recessed from the elevated plane of the primary bearing surfaces so that the primary bearing surfaces provide an interface for protecting the transducer elements from contact with the disc surface which can damage or wear the transducer elements.

As shown in one embodiment, deposit layers 130 are generally rectangular in shape and have an area A in the range of 1,000–20,000 $micron^2$. Preferably, three deposit layers 130 are formed on each rail 112, 114, and on stepped surface 118. Although a particular pattern and design is shown for the primary and secondary bearing surfaces, it should be understood that the invention is not limited to the exact pattern or design shown, nor is the invention limited to the plurality of primary bearing surfaces as shown.

Preferably, primary bearing surface deposit layers 130 may be textured to provide stiction control between the slider 72 and disc surface 54 for contact starts and stops and to improve wear behavior of the bearing. Texturing the bearing surface improves lubricant retention (air and lubricant) for improved hydrodynamic characteristics for the bearing. The deposit layer may be textured by various known texturing techniques including laser texturing, mechanical texturing, or by other known deposit texturing techniques.

Figure 10:
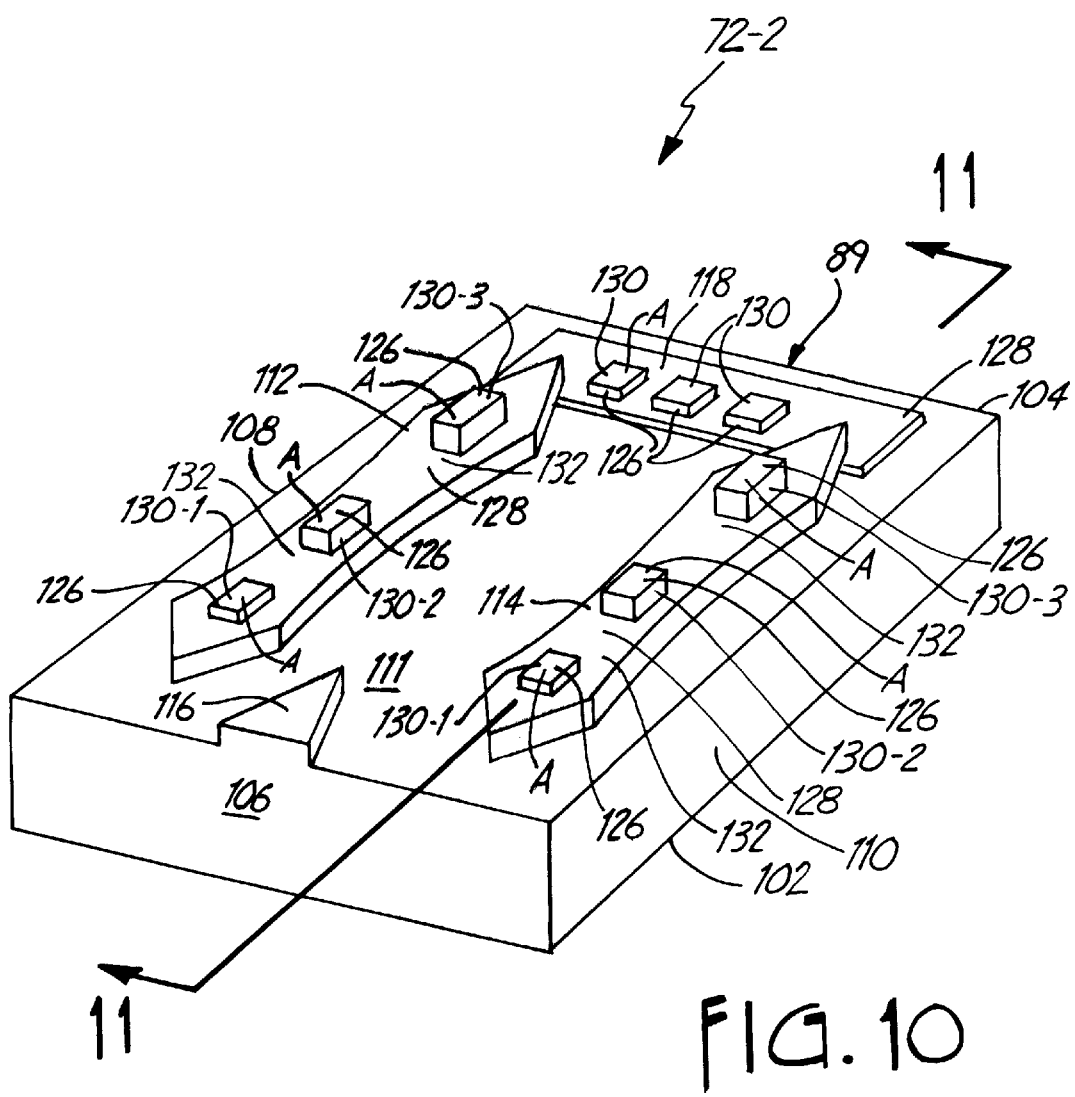
FIG. 10 is a perspective view of an alternate embodiment of a slider of the present invention.
Figure 11:
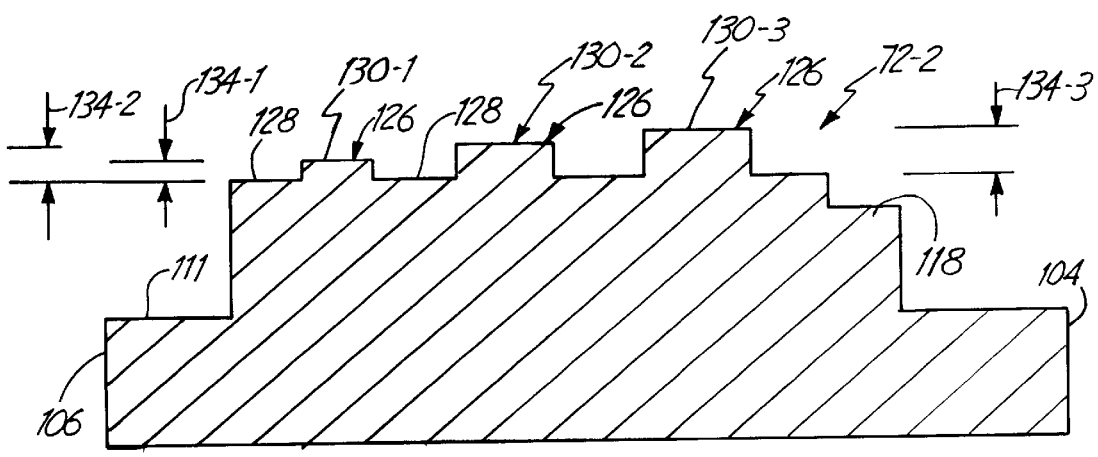
FIG. 11 is a cross-sectional view taken along line 11—11 of FIG. 10.

In an alternate embodiment of slider 72-2 illustrated in FIGS. 10–11, the primary bearing surfaces 126 are formed of varied thickness deposit layers 130-1, 130-2, and 130-3. As illustrated in FIG. 11, the thickness (or elevation) 134 of deposit layers 130-1, 130-2, and 130-3 increases from the trailing edge 106 to the leading edge 104. In particular, the elevation of layer 130-1 is 134-1, 130-2 is 134-2, and 130-3 is 134-3. The thickness dimensions 134 of deposit layers 130-1, 130-2, and 130-3 may be varied to elevate the leading edge above the trailing edge for desired "takeoff" and operation characteristics. Typically, the slider flies at a positive pitch angle where the trailing edge 106 flies closer to the disc surface than the leading edge 104. In the embodiment shown, the thickness of deposit layer 130-1 is lower so that the primary bearing surface is lower at the trailing edge than at the leading edge so that the primary bearing surfaces at the trailing edge 106 do not interfere or contact the disc surface due to the fly height dynamics of the suspension assembly and air bearing 89.

Although the present invention has been described with reference to preferred embodiments, workers skilled in the art will recognize that changes may be made in form and detail without departing from the spirit and scope of the invention.

What is claimed is:

1. A data storage system comprising:
    a base;
    a disc rotationally coupled to the base and having a disc surface;
    a disc motor; and
    a head operably supported relative to the disc surface for operation, said head including:
        at least one transducer element; and
        a slider supporting the at least one transducer element and the slider including:
            a substrate formed of a first substrate material and including a first bearing surface facing the disc surface, and
            a layer of a second tribological material deposited on a selected portion of the first bearing surface and not on the entire first bearing surface to form a second offset bearing surface spaced from the first bearing surface said first and second offset bearing surfaces forming a multi-tier bearing structure and the deposited layer having a thickness sized to position the first and second offset bearing surfaces in close proximity to provide bearing lift force and to offset the first and second bearing surfaces a distance to provide dampening and stiffness characteristics.

2. The data storage system of claim 1 wherein the first bearing surface is formed by a subtractive process which removes a portion of the substrate.

3. The data storage system of claim 1 including a plurality of first bearing surfaces and at least one of the plurality of first bearing surfaces includes a plurality of spaced-apart second bearing surfaces over the at least one first bearing surface to form dispersed dampening pockets along a flow path between a leading edge and a trailing edge of the slider.

4. The data storage system of claim 1 wherein the second material of the deposited layer is a diamond-like carbon.

5. The data storage system of claim 1 wherein the thickness of the deposited layer is in a range of approximately 1–3 $\mu$ inches.

6. The data storage system of claim 1 wherein the at least one transducer element is recessed from the second offset bearing surface.

7. The data storage system of claim 1 wherein the second offset bearing surface is textured.

8. The data storage system of claim 1 wherein the slider includes a leading edge and a trailing edge and a plurality of second bearing surfaces and the thickness of the deposited layers forming the second bearing surfaces is greater at the leading edge of the slider than at the trailing edge of the slider.

9. The slider of claim 1 including a plurality of second offset bearing surfaces wherein the second offset bearing surfaces have an area dimension in a range of 1,000–20,000 micron$^2$ and are rectangular in shape.

10. A slider adapted to support at least one transducer element for a data storage system comprising:
    a bearing facing a disc surface of a disc of the data storage device, said bearing including:
        a multi-tier bearing means for dampening vibration due to dynamic operating characteristics.

11. The slider of claim 10 wherein the multi-tier bearing means includes a bearing tier of diamond-like carbon.

12. The slider of claim 10 wherein the multi-tier bearing means includes a tier separation in a range of approximately 1–3 $\mu$ inches.

13. The slider of claim 10 wherein the multi-tier bearing means includes a textured bearing tier surface.

14. The slider of claim 10 wherein the slider includes a leading edge and a trailing edge and the multi-tier bearing means includes a plurality of deposited tiers and a thickness of the deposited tiers is greater at the leading edge than at the trailing edge of the slider.

15. The slider of claim 10 wherein the multi-tier bearing means includes a multi-tier leading edge step including a substrate tier formed of a substrate material and a deposited tier formed of a second tribological material.

16. The slider of claim 10 wherein the multi-tier bearing means includes a plurality of spaced dampening pockets along a flow path from a leading edge to a trailing edge of the slider formed by multi-tier bearing surfaces.

17. A slider supporting transducers including a raised bearing formed by the process comprising the steps of:
    forming a first raised bearing surface on a slider substrate formed of a first substrate material; and
    depositing a layer of a second tribological material on portions of the first raised bearing surface and not the entire first raised bearing surface to form a multi-tier bearing with offset first and second bearing surfaces.

18. The slider of claim 17 wherein the first raised bearing surface is formed of a subtractive masking process.

19. The slider of claim 17 and formed by the process further comprising the step of:
    texturing the second bearing surface elevated from the first bearing surface.

* * * * *